Victor F. G. Tull
Frederick E. Duffield
INVENTORS

BY
ATTORNEY

United States Patent Office 3,493,912
Patented Feb. 3, 1970

3,493,912
STRAIN RESPONSIVE TRANSDUCER MEANS
OF THE DIAPHRAGM TYPE
Victor Frederick George Tull, South Harrow, and Frederick Edward Duffield, New Denham, England, assignors to Ether Engineering Limited
Filed Oct. 25, 1967, Ser. No. 677,974
Claims priority, application Great Britain, Oct. 25, 1966, 47,837/66
Int. Cl. G01l 1/22
U.S. Cl. 338—2                 4 Claims

ABSTRACT OF THE DISCLOSURE

The transducer device disclosed comprises a metal diaphragm on which a semiconductor beam is mounted diametrically. The active transducer elements respond to strain of the diaphragm and comprise spaced localized regions of the beam defined by diffused p-n junctions. Some active elements are disposed at the middle of the diaphragm and respond in the opposite sense to others which are disposed at the edge of the diaphragm, the diaphragm being edge supported by means including an integral peripheral mounting ring. Electrical connection is made only to some of the active elements.

This invention relates to transducer devices, and particularly relates to a transducer device of the kind including as an active transducer element a localized region in a body of semiconductor material. Such devices have very desirable characteristics.

In one device of this kind, an active element is formed by a chip of semiconductor material having a single p-n junction formed in it to define a localized region. A plurality of these chips are then secured by adhesive to a flexure member, which may be for instance a metal diaphragm. The manufacture of such a device presents certain problems. For instance, it is difficult to position the individual chips accurately relative to each other on the flexure member, and the size of the individual chips prevents the most compact configurations being used. It is difficult to match one to another the electrical properties of the individual active elements. The use of the adhesive introduces hysteresis into the strain response.

In our United Kingdom patent specification No. 1,094,862 another device is disclosed, in which a plurality of active elements are formed by separate localized regions of a single member of semiconductor material in the form of a diaphragm. The semiconductor diaphragm itself forms the flexure member. Such a device has advantages over the device described above; for instance the active elements are readily positioned accurately relative to each other, and may be closely adjacent to each other. Particularly if the active elements are formed by diffusion techniques, as described in the aforementioned U. K. specification, the electrical properties of the individual active elements may be closely matched. No adhesive is necessary to secure the active elements to the flexure member. However, in certain circumstances this integral device also has disadvantages; the semiconductor diaphragm must be sufficiently thick to withstand the stress imposed on it in use, but the thicker the diaphragm, the less is the bending strain to which the diaphragm can be subjected without risk of fracturing or otherwise damaging the diaphragm. Since the usual semiconductor materials are all brittle, it is very difficult to achieve a compromise between these conflicting requirements which enables satisfactory use to be made of the otherwise outstanding properties of the device, and also, it is difficult to form other than the most simple shapes for the diaphragm which complicates the problem of mounting the diaphragm. Moreover, the semiconductor material is not chemically inert to all substances, which can be inconvenient where the transducer device is designed to respond to fluid pressure.

One aspect of the present invention provides a transducer device including a diaphragm for flexure as a function of an applied stress, a beam of semiconductor material mounted on and extending across a major face of said diaphragm, and a plurality of spaced active transducer elements for responding to strain of said beam with said flexure of said diaphragm, each of said active elements comprising a localized region of said beam defined by a semiconductor junction.

Another aspect of the present invention provides a method of making a transducer device for response to an applied stress, comprising mounting a beam of semiconductor material on and extending across a major face of a diaphragm, said diaphragm being adapted for flexure in response to said stress, and forming a plurality of active transducer elements responsive to strain of said beam with said flexure by steps including defining a plurality of spaced localized regions of said beam by semiconductor junction elements.

Features and advantages of the invention will appear from the following description of embodiments thereof, given by way of example with reference to the accompanying drawings, in which.

Figure 2:
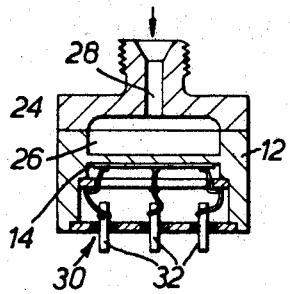
FIGURE 2 is a sectional view of a pressure transducer.
Figure 3:
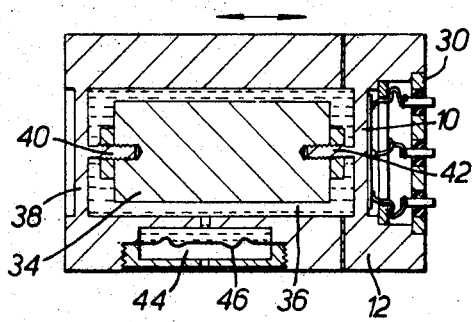
FIGURE 3 is a sectional view of an accelerometer.
Figure 4:
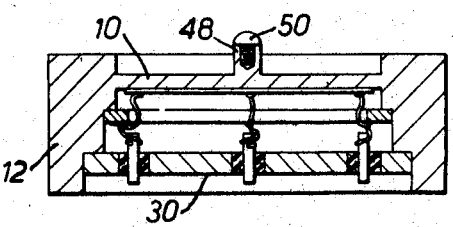
FIGURE 4 is a sectional view of a load cell.

Each of the transducer devices shown in FIGURES 2 to 4 of the drawings includes a strain responsive unit comprising a plurality of localized regions of a beam member of semiconductor material which is secured diametrically on a substantially planar surface of a circular diaphragm flexure member to which the stress to which the device responds can be applied, the resistances of the active elements being a function of the resulting strain of the beam member. Some of the active elements are disposed in a middle region of the beam, near the centre of the diaphragm, and these elements respond to the applied stress in the opposite sense to the other active elements which are disposed in end regions of the beam member, near the periphery of the diaphragm.

Figure 1:
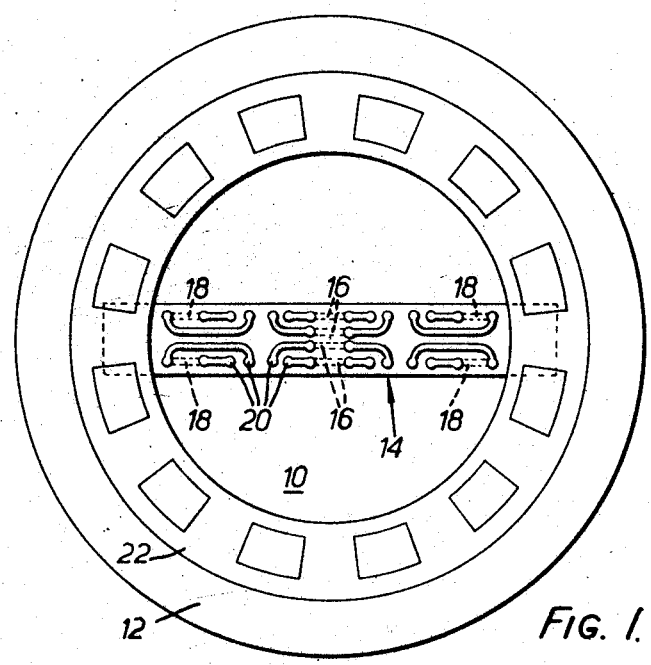
FIGURE 1 is a plan view of a unit including active transducer elements.

Each of the complete devices shown in FIGURES 2 to 4 includes a unit similar to that shown in FIGURE 1. This unit comprises a circular diaphragm 10 machined from a block of metal with an integral peripheral wall 12 by which the unit may be mounted, the wall 12 being rigid by comparison with the diaphragm 10 since it is considerably thicker than the diaphragm. A beam 14 of semiconductor material is mounted on a substantially planar surface of the diaphragm 10, being secured to the diaphragm by an adhesive, such as an epoxy resin, the beam extending almost to the periphery of the diaphram at each end. Localized elongate regions of the beam 14 indicated by the references 16 and 17 are defined by respective p-n junctions, and these regions provide the active transducer elements. The regions 16 are disposed near the middle of the beam, and the regions 18 are disposed at opposite ends of the beam, the regions 16 and 18 all being disposed with their lengths parallel to the length of the beam, and the resistances of the regions 16 thus vary in the opposite sense to the resistances of the regions 18 when a localized or distributed force is applied to the opposite main face of the diaphragm 10.

The beam 14 comprises a body of silicon, the p-n junctions being formed in known fashion by diffusion of impurity material through windows formed photolithographically in a layer of oxide on the surface of the beam. Terminals such as 20 for the regions 16 and 18 are formed at points remote from the regions by metallic layers deposited on the surface of the oxide layer and extending to contact the ends of the regions. Connection to the termianls such as 20 is made by thin wires (not shown in FIGURE 1) which are bonded, for instance by compression welding, to the terminals. For convenience, the lead wires are soldered to more substantial leads (also not shown in FIGURE 1) on an insulating annulus 22 supported on a ledge inside the wall 12.

In one particular example the length of the beam 14 was 12 mm., its width was 2 mm., and its thickness was 0.05 mm. The regions 16 and 18 were 0.05 mm. wide, and 1.0 mm. long. The material of the beam was n-type silicon, the regions 16 and 18 being p-type; the length of the beam was aligned with the 111 crystal axis. The material of the diaphragm 10 and wall 12 was precipitation-hardening stainless steel; the materials known by the trade names Monel and Inconel are also suitable.

In use two of the elements 16 and two of the elements 18 may be connected in opposite arms of a bridge circuit, or a double-potentiometer circuit. Four each of the elements 16 and 18 are provided, and the elements used can be selected for optimum matching of electrical characteristics; moreover the rejection rate in manufacture of the units is reduced since if one or two of the elements 16 and 18 is defective these need not be used.

Referring now to FIGURE 2, the pressure transducer device shown comprises a unit similar to that shown in FIGURE 1, with a member 24 sealed to one end of the wall 12 to define a cavity 26 at the main face of the diaphragm 10 opposite the beam 14, the cavity having a fluid entry port 28. A terminal assembly 30 is sealed to the opposite end of the wall 12, to enclose the beam 14, the assembly comprising terminal pins 32 extending through glass-to-metal seals.

In the accelerometer shown in FIGURE 3, an inertial mass 34 is supported in a cavity 36 formed between two diaphragms, one of which is the diaphragm 10 of a unit generally similar to that shown in FIGURE 1, and the other of which is a similar diaphragm 38, which need have no transducer elements associated with it. The beam 14 is outside the cavity 36. Pins 40 and 42 are formed integrally with the diaphragms 10 and 38 at their centres and are secured to opposite ends of the mass 34. The cavity 36 is filled with a liquid which damps oscillatory movement of the inertial mass and the cavity 36 connects with a subsidiary cavity 44, divided by a relatively weak diaphragm 46 which accommodates changes in the pressure of the damping liquid with changes in temperature. The device is responsive to acceleration in the direction indicated by the double-headed arrow, and is relatively insensitive to acceleration in transverse directions.

The load cell shown in FIGURE 4 comprises a unit similar to the unit shown in FIGURE 1, with a projection 48 formed integrally with the diaphragm 10 at its centre, on the opposite side to the beam 14, the projection 48 being capped by a button 50. The force to be measured may be applied between the button 50 and the opposite end of the wall 12.

It will be seen that in the above devices a large range of applied stresses may be measured without impairing unduly the sensitivity of the devices. The devices may readily be made very compact, and may be manufactured accurately and yet simply, with a low rate of rejection of defective devices in the manufacture. Although a measure of hysteresis is introduced into the response of the devices by the use of adhesive, the flexure members are more readily mounted than in the devices of our aforementioned U. K. specification No. 1,094,862. The gauge element resistance and sensitivity can readily be chosen to suit particular requirements.

We claim:
1. Strain responsive transducer means, comprising a diaphragm;
   mounting means rigidly supporting said diaphragm by its edge for flexure as a function for the stress applied thereto;
   a beam of semiconductor material mounted on a major face of and extending across said diaphragm;
   a plurality of active transducer elements arranged in spaced relationship along said beam, said transducer elements being responsive to the strain imparted to said beam by the flexure of said diaphragm, each of said active transducer elements comprising a localized region of said beam defined by a semiconductor junction, first and second ones of said active elements being disposed adjacent central and edge portions of said diaphragm, respectively, whereby said first and second elements are responsive in opposite senses to the strain of said beam; and
   electrical conductor means connected with at least said first and second transducer elements.

2. Apparatus as defined in claim 1, wherein said diaphragm is generally circular, and further wherein said mounting means comprises a rigid mounting ring integral with the peripheral edge portion of said diaphragm.

3. Apparatus as defined in claim 1, and further including housing means containing a cavity adapted to receive pressure fluid, and means connecting said diaphragm with said housing for flexure by the fluid contained in said cavity, said diaphragm being so arranged that only that face of said diaphragm opposite said major face upon which said beam is mounted is directly subjected to the pressure fluid in said cavity, whereby said diaphragm separates said beam from the fluid.

4. Apparatus as defined in claim 1, wherein said conductor means are connected solely with selected ones of said active transducer elements.

References Cited

UNITED STATES PATENTS

| | | | |
|---|---|---|---|
| 3,049,685 | 8/1962 | Wright | 338—2 |
| 3,213,681 | 10/1965 | Pearson | 338—4 |
| 3,270,554 | 9/1966 | Pfann | 338—2 X |
| 3,303,451 | 2/1967 | Yuan | 338—4 |
| 3,325,761 | 6/1967 | McLellan | 338—4 |

FOREIGN PATENTS

| | | |
|---|---|---|
| 1,000,456 | 8/1965 | Great Britain. |

OTHER REFERENCES

Electronics, Oct. 17, 1956, p. 155.

REUBEN EPSTEIN, Primary Examiner

U.S. Cl. X.R.

338—4, 5